United States Patent
Zhou et al.

(10) Patent No.: US 9,431,931 B2
(45) Date of Patent: Aug. 30, 2016

(54) CONTROLLER FOR A BRUSHLESS MOTOR

(71) Applicant: Dyson Technology Limited, Wiltshire (GB)

(72) Inventors: Yongji Zhou, Swindon (GB); Libo Zheng, Swindon (GB); Hanping Dai, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 14/304,465

(22) Filed: Jun. 13, 2014

(65) Prior Publication Data
US 2014/0368139 A1 Dec. 18, 2014

(30) Foreign Application Priority Data

Jun. 13, 2013 (GB) .................................. 1310567.1

(51) Int. Cl.
*H02P 1/24* (2006.01)
*H02P 6/00* (2016.01)
*H02P 7/29* (2016.01)
*H02P 6/18* (2016.01)

(52) U.S. Cl.
CPC ............... *H02P 6/002* (2013.01); *H02P 6/182* (2013.01); *H02P 7/29* (2013.01)

(58) Field of Classification Search
CPC .......... H02P 6/008; H02P 6/002; H02P 6/14; H02P 6/142; H02P 25/082; H02P 6/085; H02P 6/182; H02P 7/29
See application file for complete search history.

(56) References Cited

U.S. PATENT DOCUMENTS

| 2006/0066280 A1 | 3/2006 | Bhaumik et al. |
| 2007/0222403 A1 | 9/2007 | Disser et al. |
| 2010/0253250 A1 | 10/2010 | Marvelly et al. |
| 2011/0254484 A1 | 10/2011 | Dai |
| 2011/0254489 A1* | 10/2011 | Greetham ............... H02P 6/002 318/400.14 |
| 2011/0257791 A1* | 10/2011 | Hawker .................... H02P 6/14 700/275 |

FOREIGN PATENT DOCUMENTS

| GB | 2480902 | 12/2011 |
| JP | 2010-246373 | 10/2010 |
| WO | WO-2009/020737 | 2/2009 |
| WO | WO-2012/010445 | 1/2012 |

OTHER PUBLICATIONS

Search Report mailed Dec. 4, 2013 directed towards GB Application No. 1310567.1; 1 page.
International Search Report and Written Opinion dated Nov. 3, 2014, directed to International Application No. PCT/GB2014/051776; 9 pages.

* cited by examiner

*Primary Examiner* — Karen Masih
(74) *Attorney, Agent, or Firm* — Morrison & Foerster LLP

(57) ABSTRACT

A controller for a brushless motor that includes a PWM module configured in half-bridge or full-bridge mode. The PWM module outputs control signals for controlling the excitation of a winding of the motor, and one of the duty cycle and the period of the PWM module defines a time at which the winding is commutated.

15 Claims, 9 Drawing Sheets

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-Right |
| 0 | 1 | 1 | 0 | 0 | 1 | 1 | 0 | Excite Right-to-Left |
| 0 | 1 | 0 | 1 | 0 | 1 | 0 | 1 | Freewheel |

Fig. 3

CONTROLLER FOR A BRUSHLESS MOTOR

REFERENCE TO RELATED APPLICATION

This application claims priority of United Kingdom Application No. 1310567.1, filed Jun. 13, 2013, the entire contents of which are incorporated herein by reference.

FIELD OF THE INVENTION

The present invention relates to a controller for a brushless motor.

BACKGROUND OF THE INVENTION

The controller of a brushless motor typically comprises a processor for executing different software routines in response to different events. A common method of event handling is through the use of interrupts. In response to an interrupt, the processor interrupts execution of the main code and services the interrupt by executing an interrupt service routine (ISR). When executing an ISR, the processor is unable to service any other interrupts. Consequently, should two interrupts occur at the same time, the execution of one of the ISRs will be delayed. This delay may then adversely affect the performance of the motor. For example, the controller may employ a timer interrupt to control the time at which a phase winding of the motor is commutated. Any delay in servicing this interrupt is then likely to affect the power and/or efficiency of the motor.

SUMMARY OF THE INVENTION

The present invention provides a controller for a brushless motor, the controller comprising a PWM module configured in half-bridge or full-bridge mode, wherein the PWM module outputs control signals for controlling the excitation of a winding of the motor, and one of the duty cycle and the period of the PWM module defines a time at which the winding is commutated.

The control signals for commutating the winding are therefore generated by hardware rather than by software, i.e. by peripherals rather than by the processor of the controller.

It is not therefore necessary to generate an interrupt in order to commutate the winding. As a result, interrupt clashing may be avoided or reduced.

The other of the duty cycle and the period of the PWM module may define a time at which the winding is freewheeled. This then has the advantage that the control signals for both commutating and freewheeling the winding are generated by hardware without the need for a software interrupt. Since the duty cycle and the period define the times at which the winding is commutated and freewheeled, each cycle of the PWM module defines one half of an electrical cycle of the motor. The two pulses of each PWM cycle therefore define the periods over which the winding is excited and freewheeled.

The duty cycle and/or the period of the PWM module may be updated after each cycle of the PWM module. Moreover, the duty cycle and/or the period may be updated in response to changes in the speed of the motor and/or the magnitude of the supply voltage used to excite the winding. By updating the duty cycle and/or the period after each PWM cycle, the controller is able to respond promptly to changes in the speed of the motor and/or changes in the supply voltage. As a result, relatively good control may be achieved over the power and/or efficiency of the motor.

The controller may divide each electrical half-cycle of the motor into a conduction period followed by a freewheel period, and the PWM module may output control signals for exciting the winding during the conduction period and for freewheeling the winding during the freewheel period. The duty cycle of the PWM module then defines one of a time at which the conduction period or the freewheel period starts, and the period defines the other of a time at which the conduction period or the freewheel period starts.

The PWM module may output control signals for commutating the winding relative to zero-crossings in back EMF or rising inductance in the winding at times that are defined by a phase period. The duty cycle or the period of the PWM module is then defined by the phase period. The power of the motor is typically sensitive to changes in the phase period. Accordingly, by varying the duty cycle or the period, relatively good control may be achieved over the power and/or efficiency of the motor.

The controller may comprise a first PWM module configured in half-bridge mode, and a second PWM module configured in half-bridge mode. The first PWM module then modulates the control signals during one half of an electrical cycle of the motor, and the second PWM module modulates the control signals for the other half of the electrical cycle. Two PWM modules configured in half-bridge mode have the advantage that the control signals may be used to close both low-side switches of an inverter during freewheeling. As a result, the efficiency of the motor may be improved. Two PWM modules have the further advantage that the modules may operate without ever needing to generate a software interrupt. In particular, the first PWM module may be updated during the cycle of the second PWM module, and the second PWM module may be updated during the cycle of the first PWM module. As a result, one PWM module may be updated without interrupting the operation of the other PWM module. Moreover, each PWM module may be updated at time that is convenient for the processor of the controller.

The controller may receive a rotor-position signal having edges, and the controller may comprise a processor that updates the first PWM module in response to a rising edge in the rotor-position signal, and updates the second PWM module in response to a falling edge in the rotor-position signal. The two PWM modules are then updated without the need for the PWM modules to interrupt the processor. The controller may determine the speed of the motor from the period between edges of the rotor-position signal. Updating the PWM modules in response to edges of the rotor-position signal then has the further advantage that the PWM modules may be immediately updated to reflect changes in the speed of the motor.

The controller may comprise a PWM module configured in full-bridge mode. The PWM module then generates an interrupt at the end of each PWM cycle. A processor of the controller then updates the duty cycle and/or the period of the PWM module in response to the interrupt. An advantage of this scheme is that just one PWM module is required and thus a simpler and potentially cheaper controller may be used. Additionally, the control signals output by the PWM module may be used to close only one low-side switch of an inverter during freewheeling. This then has the advantage that, should the switches of the inverter be capable of conducting in both directions, current in the winding is prevented from generating negative torque during freewheeling. Although an interrupt is generated by the PWM module, the interrupt is required only to update the PWM module. The PWM module still generates control signals for commutating and freewheeling the winding without the need for an interrupt.

The present invention also provides a controller for a brushless motor, the controller comprising a PWM module configured in half-bridge or full-bridge mode, wherein the controller divides each electrical half-cycle of the motor into a conduction period followed by a freewheel period, the PWM module outputs control signals for exciting a winding of the motor during the conduction period and for freewheeling the winding during the freewheel period, the duty cycle of the PWM module defines one of a time at which the conduction period or the freewheel period starts, and the period of the PWM module defines the other of a time at which the conduction period or the freewheel period starts.

The control signals responsible for exciting and freewheeling the winding are therefore generated by hardware rather than by software, i.e. by peripherals rather than by the processor of the controller. It is not therefore necessary to generate an interrupt in order to excite or freewheel the winding. As a result, interrupt clashing may be avoided or reduced. Since each electrical half-cycle of the motor is divided into a conduction period and a freewheel period, the two pulses of each PWM cycle define the periods over which the winding is excited and freewheeled.

The present invention further provides a control circuit for controlling a brushless motor, the control circuit comprising an inverter and a controller as described in any one of the preceding paragraphs, wherein the inverter comprises a full bridge of switches coupled to a winding of the motor, the controller comprises a single PWM module configured in full-bridge mode or two PWM modules configured in half-bridge mode, and the PWM module or modules output control signals for controlling the switches of the inverter.

The present invention also provides a motor assembly comprising a permanent-magnet motor having a single phase winding, and a control circuit as described in the preceding paragraph.

BRIEF DESCRIPTION OF THE DRAWINGS

In order that the present invention may be more readily understood, embodiments of the invention will now be described, by way of example, with reference to the accompanying drawings, in which:

FIG. 3 details the allowed states of the inverter in response to control signals issued by the controller of the motor assembly;

DETAILED DESCRIPTION OF THE INVENTION

Figure 1:
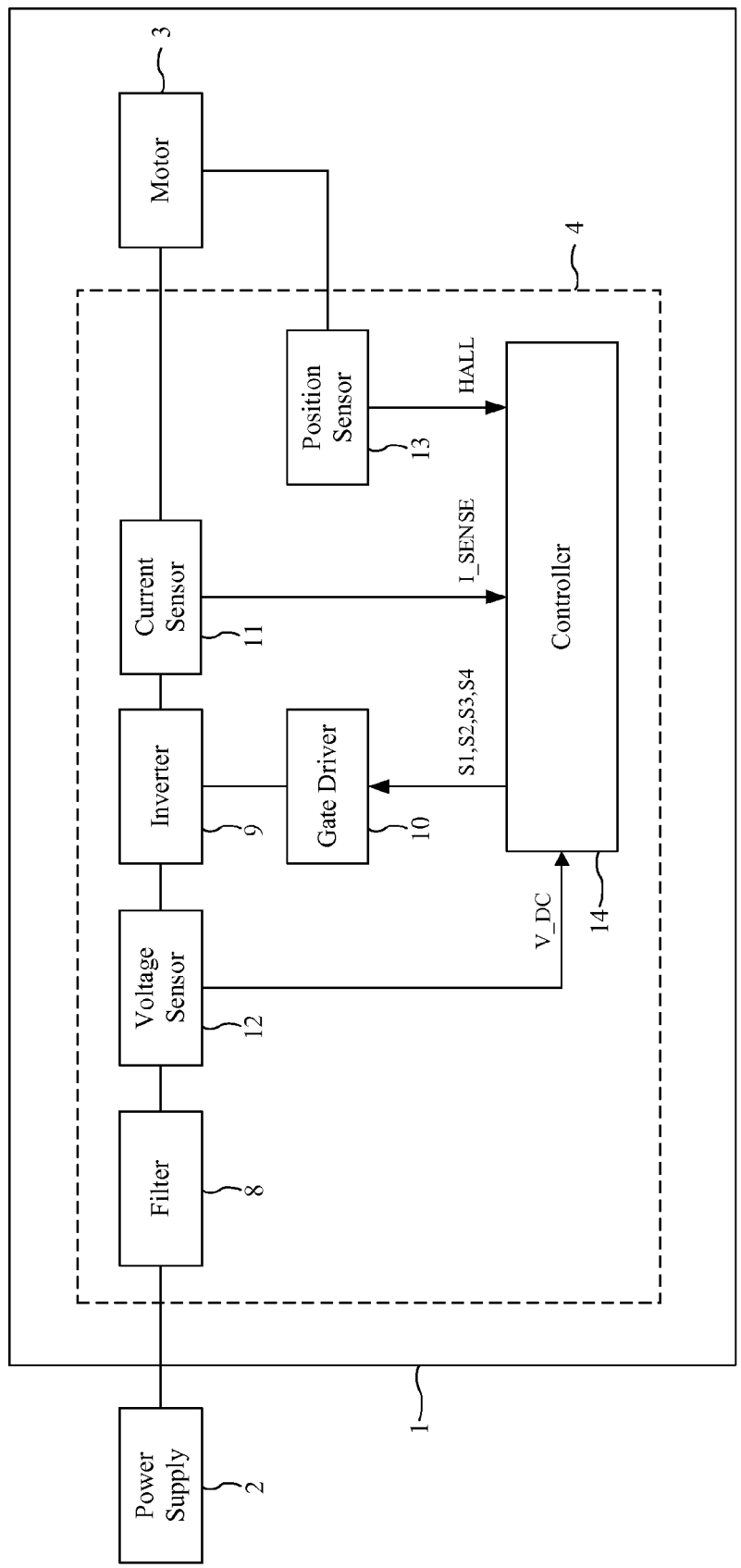
FIG. 1 is a block diagram of a motor assembly in accordance with the present invention.
Figure 2:
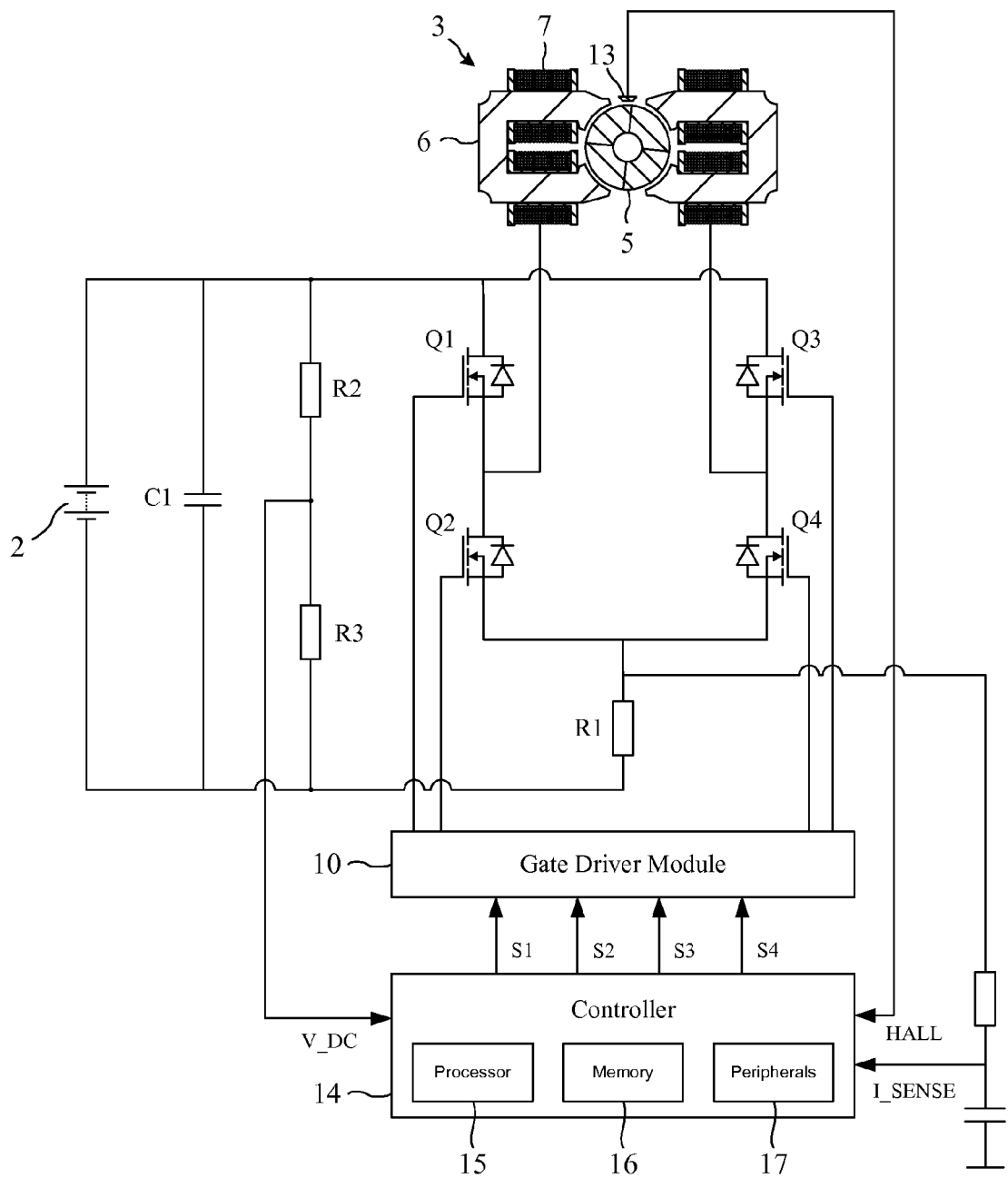
FIG. 2 is a schematic diagram of the motor assembly.

The motor assembly 1 of FIGS. 1 and 2 is powered by a DC power supply 2 and comprises a brushless motor 3 and a control circuit 4.

The motor 3 comprises a four-pole permanent-magnet rotor 5 that rotates relative to a four-pole stator 6. Conductive wires wound about the stator 6 are coupled together to form a single phase winding 7.

The control circuit 4 comprises a filter 8, an inverter 9, a gate driver module 10, a current sensor 11, a voltage sensor 12, a position sensor 13, and a controller 14.

The filter 8 comprises a link capacitor C1 that smoothes the relatively high-frequency ripple that arises from switching of the inverter 9.

The inverter 9 comprises a full bridge of four power switches Q1-Q4 that couple the phase winding 7 to the voltage rails. Each of the switches Q1-Q4 includes a freewheel diode.

The gate driver module 10 drives the opening and closing of the switches Q1-Q4 in response to control signals received from the controller 14.

The current sensor 11 comprises a shunt resistor R1 located between the inverter and the zero-volt rail. The voltage across the current sensor 11 provides a measure of the current in the phase winding 7 when connected to the power supply 2. The voltage across the current sensor 11 is output to the controller 14 as signal I_PHASE.

The voltage sensor 12 comprises a potential divider R2,R3 located between the DC voltage rail and the zero volt rail. The voltage sensor outputs signal V_DC to the controller 14, which represents a scaled-down measure of the supply voltage provided by the power supply 2.

The position sensor 13 comprises a Hall-effect sensor located in a slot opening of the stator 6. The sensor 13 outputs a digital signal, HALL, that is logically high or low depending on the direction of magnetic flux through the sensor 13. The HALL signal therefore provides a measure of the angular position of the rotor 5.

The controller 14 comprises a microcontroller having a processor 15, a memory device 16, and a plurality of peripherals 17 (e.g. ADC, comparators, timers etc.). The memory device 16 stores instructions for execution by the processor 15, as well as control parameters and lookup tables that are employed by the processor 15 during operation. The controller 14 is responsible for controlling the operation of the motor 3 and generates four control signals S1-S4 for controlling each of the four power switches Q1-Q4. The control signals are output to the gate driver module 10, which in response drives the opening and closing of the switches Q1 -Q4.

FIG. 3 summarises the allowed states of the switches Q1-Q4 in response to the control signals S1-S4 output by the controller 14. Hereafter, the terms 'set' and 'clear' will be used to indicate that a signal has been pulled logically high and low respectively. As can be seen from FIG. 3, the controller 14 sets S1 and S4, and clears S2 and S3 in order to excite the phase winding 7 from left to right. Conversely, the controller 14 sets S2 and S3, and clears S1 and S4 in order to excite the phase winding 7 from right to left. The controller 14 clears S1 and S3, and sets S2 and S4 in order to freewheel the phase winding 7. Freewheeling enables current in phase the winding 7 to re-circulate around the low-side loop of the inverter 9. In the present embodiment, the power switches Q1-Q4 are capable of conducting in both directions. Accordingly, the controller 14 closes both low-side switches Q2,Q4 during freewheeling such that current flows through the switches Q2,Q4 rather than the less efficient diodes. Conceivably, the inverter 9 may comprise power switches that conduct in a single direction only. In this instance, the controller 14 would clear S1, S2 and S3, and set S4 so as to freewheel the phase winding 7 from left to right. The controller 14 would then clear S1, S3 and S4, and set S2 in order to freewheel the phase winding 7 from right to left. Current in the low-side loop of the inverter 9 then flows down through the closed low-side switch (e.g. Q4) and up through the diode of the open low-side switch (e.g. Q2).

The controller 14 operates in one of two modes depending on the speed of the rotor 5. At speeds below a predefined threshold, the controller 14 operates in acceleration mode. At speeds at or above the threshold, the controller 14 operates in steady-state mode. The speed of the rotor 5 is determined from the interval, T_HALL, between two successive edges of the HALL signal. This interval will hereafter be referred to as the HALL period.

In each mode the controller 14 commutates the phase winding 7 in response to edges of the HALL signal. Each HALL edge corresponds to a change in the polarity of the rotor 5, and thus a change in the polarity of the back EMF induced in the phase winding 7. More particularly, each HALL edge corresponds to a zero-crossing in the back EMF. Commutation involves reversing the direction of current through the phase winding 7. Consequently, if current is flowing through the phase winding 7 in a direction from left to right, commutation involves exiting the winding from right to left.

Acceleration Mode

When operating in acceleration mode, the controller 14 commutates the phase winding 7 in synchrony with the edges of the HALL signal. Over each electrical half-cycle, the controller 14 sequentially excites and freewheels the phase winding 7. More particularly, the controller 14 excites the phase winding 7, monitors the current signal, I_PHASE, and freewheels the phase winding 7 when the current in the phase winding 7 exceeds a predefined limit Freewheeling then continues for a predefined freewheel period during which time current in the phase winding 7 falls to a level below the current limit At the end of the freewheel period the controller 14 again excites the phase winding 7. This process of exciting and freewheeling the phase winding 7 continues over the full length of the electrical half-cycle. The controller 14 therefore switches from excitation to freewheeling multiple times during each electrical half-cycle.

Figure 4:
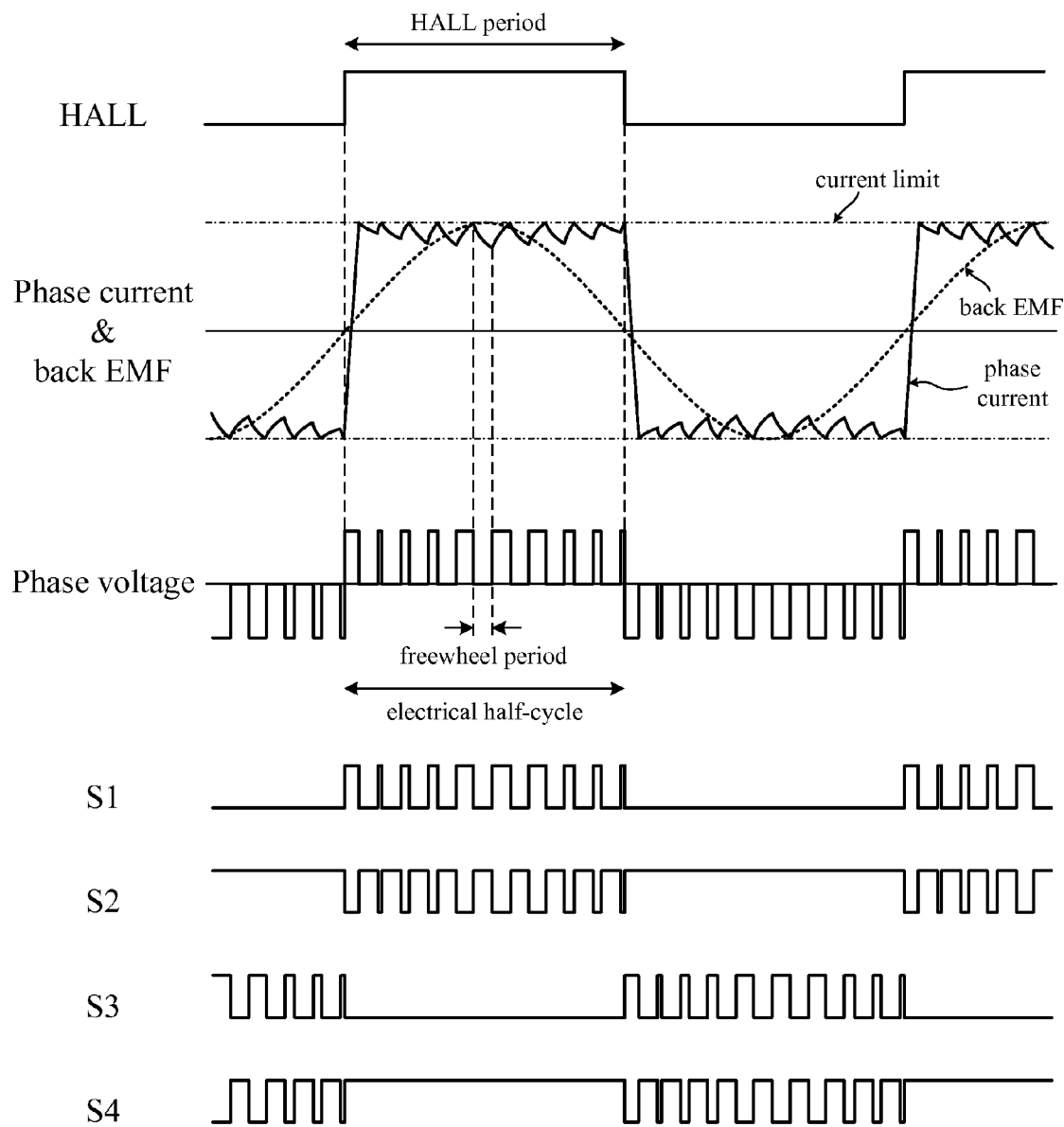
FIG. 4 illustrates various waveforms of the motor assembly when operating in acceleration mode.

FIG. 4 illustrates the waveforms of the HALL signal, the back EMF, the phase current, the phase voltage, and the control signals over a couple of HALL periods when operating in acceleration mode.

At relatively low speeds, the magnitude of the back EMF induced in the phase winding 7 is relatively small. Current in the phase winding 7 therefore rises relatively quickly during excitation, and falls relatively slowly during freewheeling. Additionally, the length of each HALL period and thus the length of each electrical half-cycle is relatively long. Consequently, the frequency at which the controller 14 switches from excitation to freewheeling is relatively high. However, as the rotor speed increases, the magnitude of the back EMF increases and thus current rises at a slower rate during excitation and falls at a quicker rate during freewheeling. Additionally, the length of each electrical half-cycle decreases. As a result, the frequency of switching decreases.

Steady-State Mode

When operating in steady-state mode, the controller 14 may advance, synchronise or retard commutation relative to each HALL edge. Advanced commutation is employed at higher rotor speeds, whilst retarded commutation is employed at lower rotor speeds. As the speed of the rotor 5 increases, the HALL period decreases and thus the time constant (L/R) associated with the phase inductance becomes increasingly important. Additionally, the back EMF induced in the phase winding 7 increases, which in turn influences the rate at which phase current rises. It therefore becomes increasingly difficult to drive current and thus power into the phase winding 7. By commutating the phase winding 7 in advance of a HALL edge, and thus in advance of a zero-crossing in back EMF, the supply voltage is boosted by the back EMF. As a result, the direction of current through the phase winding 7 is more quickly reversed. Additionally, the phase current is caused to lead the back EMF, which helps to compensate for the slower rate of current rise. Although this then generates a short period of negative torque, this is normally more than compensated by the subsequent gain in positive torque. When operating at lower speeds, it is not necessary to advance commutation in order to drive the required current into the phase winding 7. Moreover, optimum efficiency is typically achieved by retarding commutation.

The controller 14 commutates the phase winding 7 at a time relative to each HALL edge that is defined by a phase period, T_PHASE. If the phase period is positive, commutation occurs before the HALL edge, i.e. advanced commutation. If the phase period is zero, commutation occurs at the HALL edge, i.e. synchronous commutation. And if the phase period is negative, commutation occurs after the HALL edge, i.e. retarded commutation. The particular manner in which the controller 14 commutates the phase winding 7 is described below.

When operating in steady-state mode, the controller 14 divides each electrical half-cycle into a conduction period followed by a freewheel period. The controller 14 then excites the phase winding 7 during the conduction period and freewheels the phase winding 7 during the freewheel period. When operating within steady-state mode, the phase current is not expected to exceed the current limit during excitation. Consequently, the controller 14 switches from excitation to freewheeling only once during each electrical half-cycle.

The controller 14 excites the phase winding 7 for a conduction period, T_CD. At the end of the conduction period, the controller 14 freewheels the phase winding 7. Freewheeling then continues indefinitely until such time as the controller 14 commutates the phase winding 7. The controller 14 therefore controls excitation of the phase winding 7 using two parameters: the phase period, T_PHASE, and the conduction period, T_CD. The phase period defines the phase of excitation (i.e. the electrical period or angle at which the phase winding 7 is excited relative to zero-crossings in the back EMF) and the conduction period defines the length of excitation (i.e. the electrical period or angle over which the phase winding 7 is excited).

Figure 5:
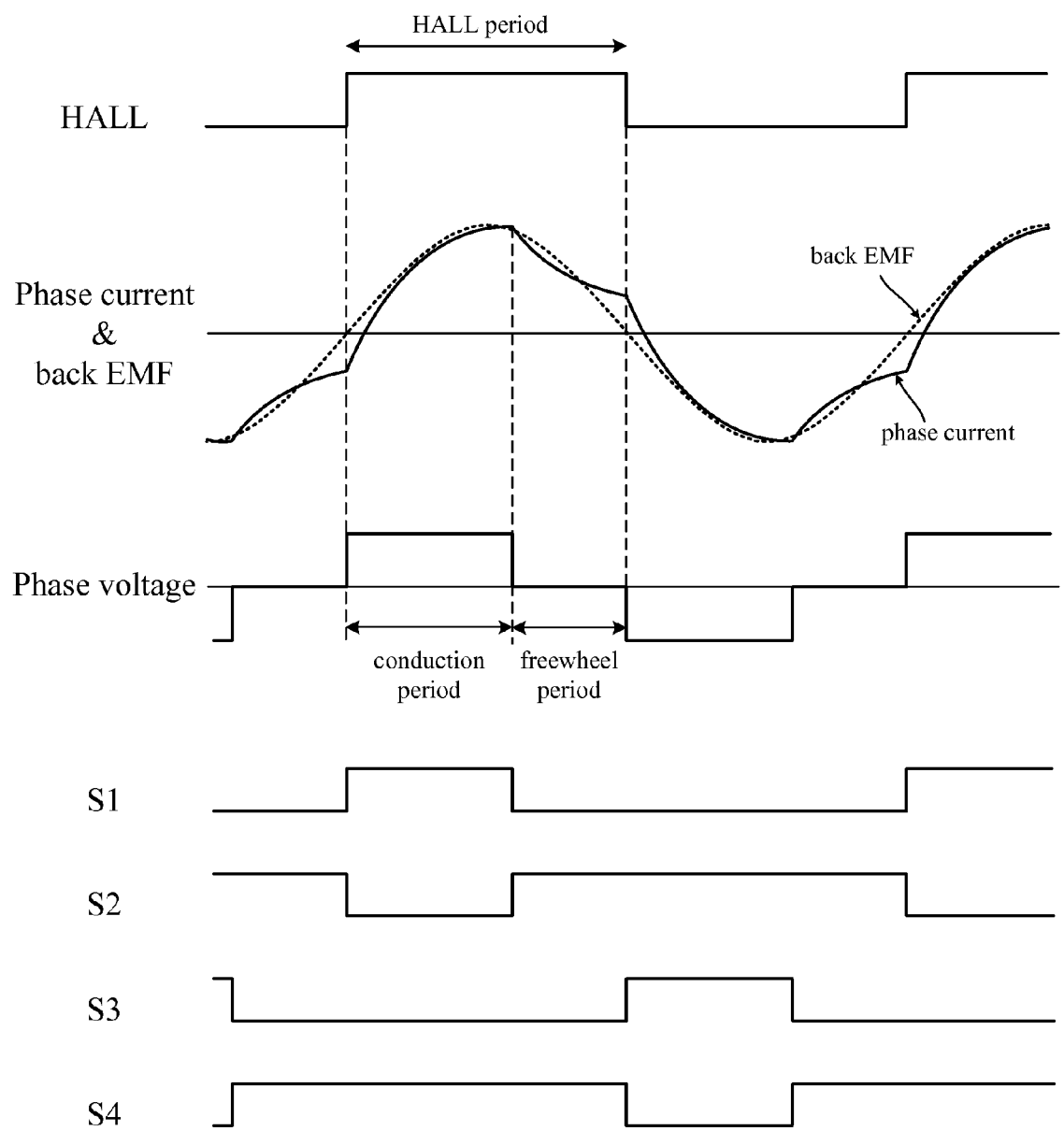
FIG. 5 illustrates various waveforms of the motor assembly when operating in steady-state mode.

FIG. 5 illustrates the waveforms of the HALL signal, the back EMF, the phase current, the phase voltage, and the control signals over a couple of HALL periods when operating in steady-state mode. In FIG. 5 the phase winding 7 is commutated in synchrony with the HALL edges.

The magnitude of the supply voltage used to excite the phase winding 7 may vary. For example, the power supply 2 may comprise a battery that discharges with use. Alternatively, the power supply 2 may comprise an AC source, rectifier and smoothing capacitor that provide a relatively smooth voltage, but the RMS voltage of the AC source may vary. Changes in the magnitude of the supply voltage will influence the amount of current that is driven into the phase winding 7 during the conduction period. As a result, the power of the motor 3 is sensitive to changes in the supply voltage. In addition to the supply voltage, the power of the motor 3 is sensitive to changes in the speed of the rotor 5. As the speed of the rotor 5 varies (e.g. in response to changes in load), so too does the magnitude of the back EMF. Consequently, the amount of current driven into the phase winding 7 during the conduction period may vary. The controller 14 therefore varies the phase period and the conduction period in response to changes in the magnitude of the supply voltage. The controller 14 also varies the phase period in response to changes in the speed of the rotor 5.

The controller 14 stores a voltage lookup table that comprises a phase period, T_PHASE, and a conduction period, T_CD, for each of a plurality of different supply voltages. The controller 14 also stores a speed lookup table that comprises a speed-compensation value for each of a plurality of different rotor speeds and different supply voltages. The lookup tables store values that achieve a particular input or output power at each voltage and speed point.

The V_DC signal output by the voltage sensor 12 provides a measure of the supply voltage, whilst the length of the HALL period provides a measure of the rotor speed. The controller 14 indexes the voltage lookup table using the supply voltage to select a phase period and a conduction period. The controller 14 then indexes the speed lookup table using the rotor speed and the supply voltage to select a speed-compensation value. The controller 14 then adds the selected speed-compensation value to the selected phase period so as to obtain a speed-compensated phase period.

The speed lookup table stores speed-compensation values that depend not only on the speed of the rotor 5 but also on the magnitude of the supply voltage. The reason for this is that, as the supply voltage decreases, a particular speed-compensation value has a smaller net effect on the power of the motor 3. By storing speed-compensation values that depend on both the rotor speed and the supply voltage, better control over the power of the motor 3 may be achieved in response to changes in the rotor speed.

It will be noted that two lookup tables are used to determine the phase period, T_PHASE. The first lookup table (i.e. the voltage lookup table) is indexed using the supply voltage. The second lookup table (i.e. the speed lookup table) is indexed using both the rotor speed and the supply voltage. Since the second lookup table is indexed using both the rotor speed and the supply voltage, one might question the need for two lookup tables. However, the advantage of using two lookup tables is that different voltage resolutions may be used. The power of the motor 3 is relatively sensitive to the magnitude of the supply voltage. In contrast, the effect that the speed-compensation value has on the power is less sensitive to the supply voltage. Accordingly, by employing two lookup tables, a finer voltage resolution may be used for the voltage lookup table, and a coarser voltage resolution may be used for the speed lookup table. As a result, relatively good control over the power of the motor 3 may be achieved through the use of smaller lookup tables, which then reduces the memory requirements of the controller 14.

Interrupt Clashing

As noted above, when operating in steady-state mode, the controller 14 may advance, synchronise or retard commutation relative to each HALL edge. One way in which this might be achieved would be as follows. In response to a HALL edge, the controller 14 subtracts the phase period, T_PHASE, from the HALL period, T_HALL, in order to obtain a commutation period, T_COM:

$$T\_COM = T\_HALL - T\_PHASE$$

The controller 14 then commutates the phase winding 7 at a time, T_COM, after the HALL edge. As a result, the controller 14 commutates the phase winding 7 relative to the subsequent HALL edge by the phase period, T_PHASE. If the phase period is positive, commutation occurs before the HALL edge, i.e. advanced commutation. If the phase period is zero, commutation occurs at the HALL edge, i.e. synchronous commutation. And if the phase period is negative, commutation occurs after the HALL edge, i.e. retarded commutation.

In order to implement this particular scheme, the controller14 might make use of timers and interrupts. So, for example, each HALL edge may generate an interrupt. More particularly, each rising edge may generate a first HALL interrupt and each falling edge may generate a second HALL interrupt. In servicing the first HALL interrupt, the processor 15 calculates and loads a first timer with the commutation period, T_COM. In servicing the second interrupt, the processor 15 loads a second timer with the commutation period, T_COM. When the first timer or the second timer overflows (i.e. when the commutation period has elapsed), the timer generates an interrupt. In servicing the timer interrupt, the processor 15 commutates the phase winding 7 and loads a third timer with the conduction period, T_CD. When the third timer overflows (i.e. when the conduction period has elapsed), the timer generates an interrupt. In servicing the interrupt of the third timer, the processor 15 freewheels the phase winding 7.

Figure 6:
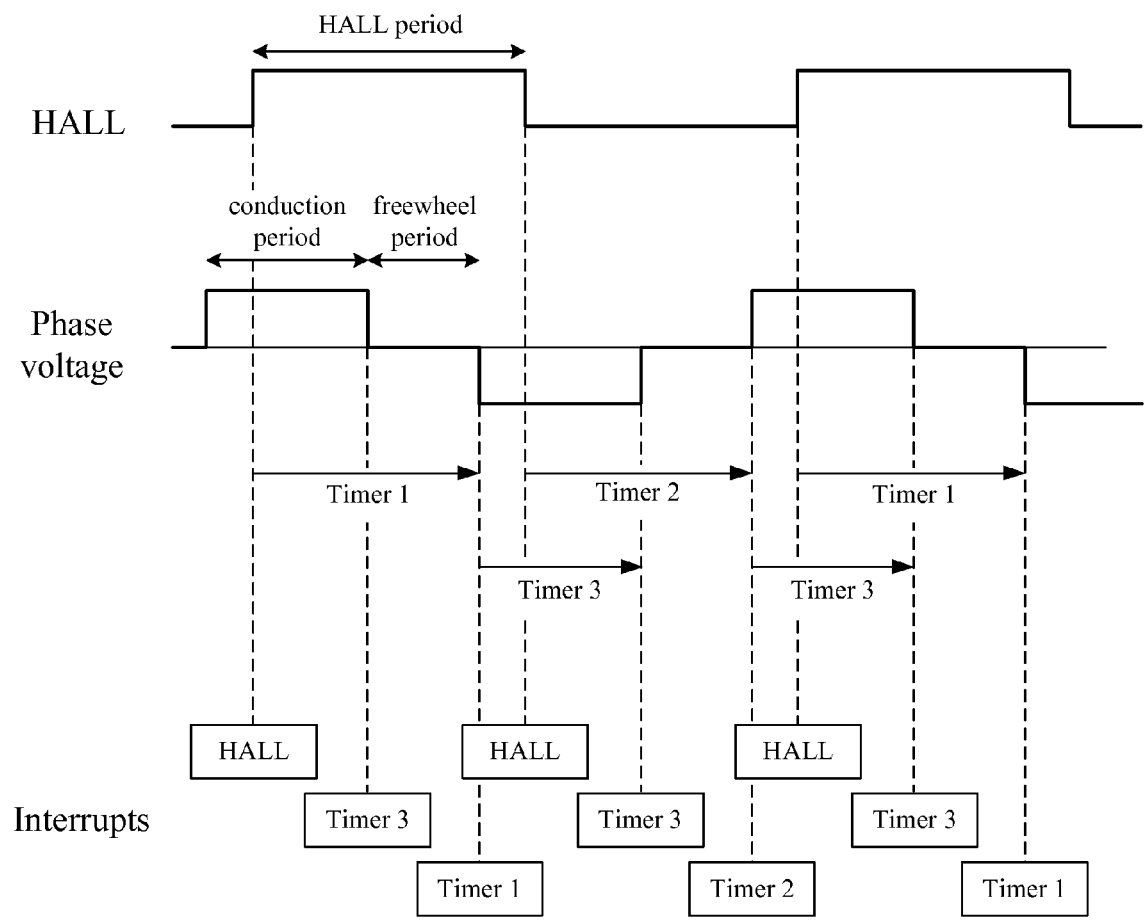
FIG. 6 illustrates the software interrupts that are generated by a hypothetical controller when operating in steady-state mode.

FIG. 6 illustrates the waveforms of the HALL signal, the phase voltage and the interrupts employed by the controller 14 when implementing the scheme described in the preceding paragraph. A difficulty with this scheme is that different interrupts may clash, i.e. occur at the same time. In the example illustrated in FIG. 6, the phase winding 7 is commutated in advance of each HALL edge. However, it can be seen that the interrupt generated by the first timer or the second timer will clash with the HALL interrupt if the phase winding 7 is commutated at or near the HALL edges. Additionally, the interrupt generated by the third timer will clash with the HALL interrupt whenever freewheeling starts at or near a HALL edge. Should two interrupts clash, the execution of one of the interrupt service routines (ISRs) will be delayed. This may then adversely affect the performance of the motor 3. In particular, it may affect the power and/or the efficiency of the motor 3. The controller 14 is therefore configured such that the control signals S1-S4 responsible for commutating and freewheeling the phase winding 7 are generated without the need for interrupts.

Figure 7:
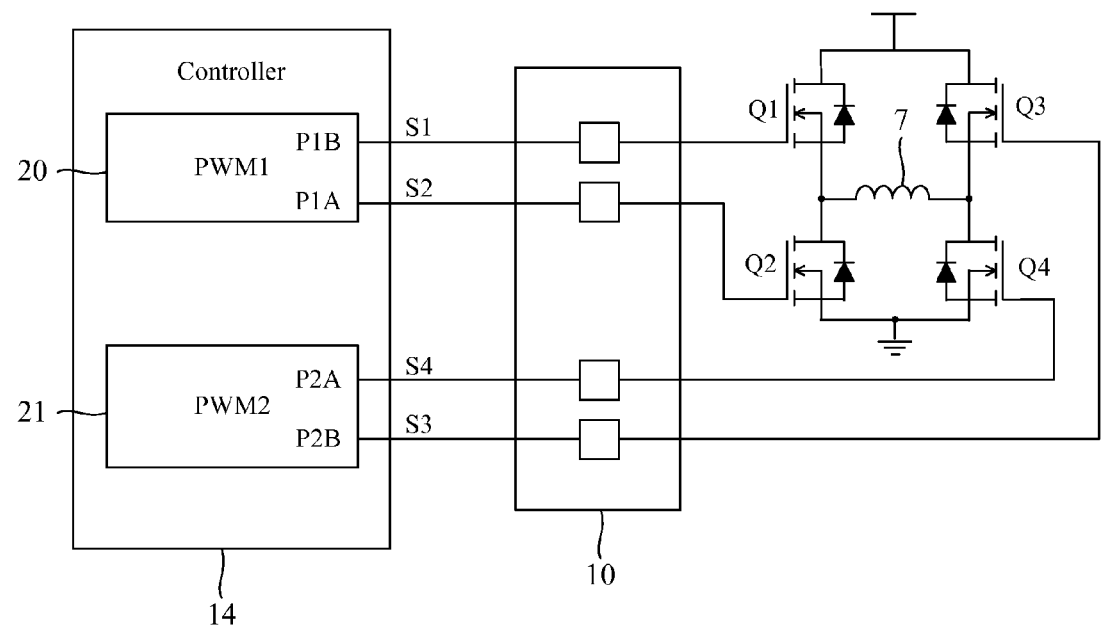
FIG. 7 illustrates the controller in a first configuration in which two PWM modules are each configured in half-bridge mode.

As illustrated in FIG. 7, the peripherals 17 of the controller 14 include two PWM modules 20,21 that are each configured to operate in half-bridge mode. Each PWM module 20,21 therefore generates two complementary PWM signals. The first PWM module 20 (PWM1) is used to generate signals S1 and S2, and the second PWM module 21 (PWM2) is used to generate S3 and S4. Each PWM module 20,21 therefore generates signals for controlling the switches Q1-Q4 of one half of the inverter bridge.

Figure 8:
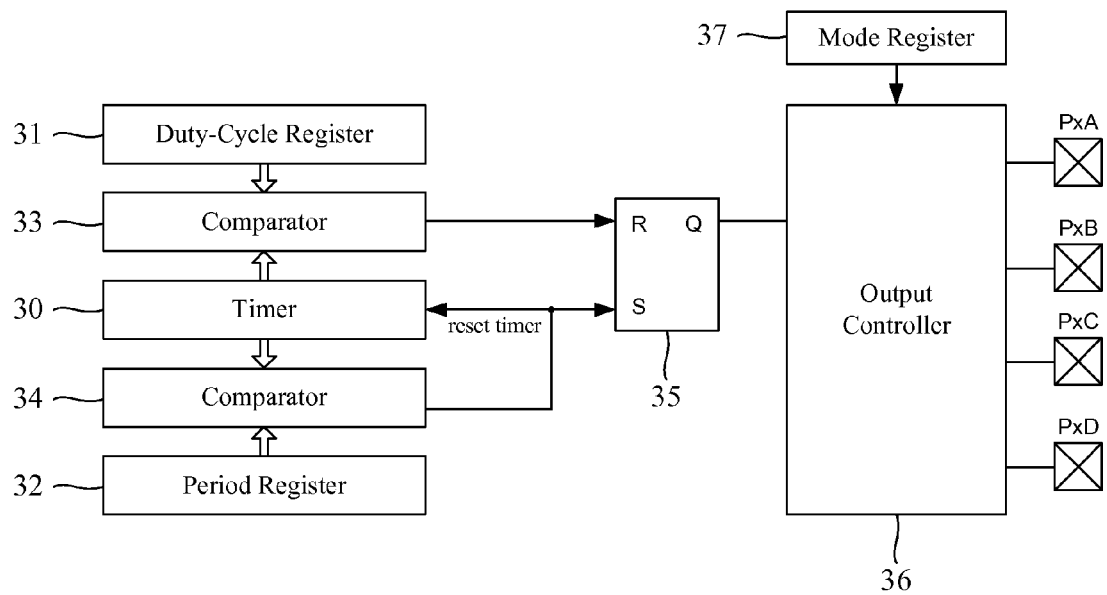
FIG. 8 illustrates the components of each PWM module.

Referring now to FIG. 8, each PWM module 20,21 comprises a timer 30, a duty-cycle register 31, a period register 32, a first comparator 33, a second comparator 34, an SR latch 35 and an output controller 36. The first comparator 33 compares the timer 30 and the duty-cycle register 31. The second comparator 34 compares the timer and the period register 32. The outputs of the two comparators 33,34 are coupled to the reset and set inputs of the SR latch 35. The output of the SR latch 35 is coupled to the output controller 36, which controls up to four pins of the controller 14 depending on how the PWM module 20,21 is configured. The PWM module 20,21 is configured via a two-bit mode register 37. When the mode register 37 is loaded with 0x00, the PWM module 20,21 operates in single mode and the output controller 36 controls a single output pin. When the mode register 37 is loaded with 0x01, the PWM module 20,21 operates in half-bridge mode and the output controller 36 controls two output pins (PxA and PxB). When the mode register 37 is loaded with 0x10 or 0x11, the output controller 36 operates in full-bridge mode (forward) or full-bridge mode (reverse), which is discussed below in more detail.

Operation of the controller 14 during steady-state mode then proceeds as follows. Each HALL edge generates a software interrupt. More particularly, each falling edge generates a first HALL interrupt and each rising edge generates a second HALL interrupt. In servicing the first HALL interrupt, the processor 15 updates and restarts the first PWM module 20. In servicing the second HALL interrupt, the processor 15 updates and restarts the second PWM module 21. For each HALL interrupt, the processor 15 loads the duty-cycle register 31 of the PWM module 20,21 with the commutation period, and loads the period register 32 with the sum of the commutation period and the conduction period, i.e.

duty cycle=$T\_HALL-T\_PHASE$ period=$T\_HALL-T\_PHASE+T\_CD$

The values that are loaded into the PWM registers 31,32 are calculated by the processor 15 during execution of the main code. Accordingly, when executing the main code, the processor 15 indexes the voltage and speed lookup tables to select a phase period, T_PHASE, and a conduction period, T_CD. The processor 15 then calculates the duty cycle and the period and stores the result in memory 16. When executing the HALL ISR, the processor 15 simply loads the values stored in the memory 16 to the registers 31,32 of the PWM module 20,21. This then ensures that the duration of the HALL ISR is as short as possible. After updating the duty cycle and period registers 31,32, the processor 15 resets the timer 30 of the PWM module 20,21, which then concludes the HALL ISR.

The timer 30 of each PWM module 20,21 increments at a frequency defined by an internal clock of the controller 14 and a prescaler. When the timer 30 and the duty-cycle register 31 correspond, the output pin for S1 (PWM1) or S3 (PWM2) is pulled logically high and the output pin for S2 (PWM1) or S4 (PWM2) is pulled logically low. This then causes the phase winding 7 to commutate. The timer 30 continues to increment. When the timer 30 and the period register 32 correspond, the output pin for S1 (PWM1) or S3 (PWM2) is pulled logically low and the output pin for S2 (PWM1) or S4 (PWM2) is pulled logically high. This then causes the phase winding 7 to freewheel.

Figure 9:
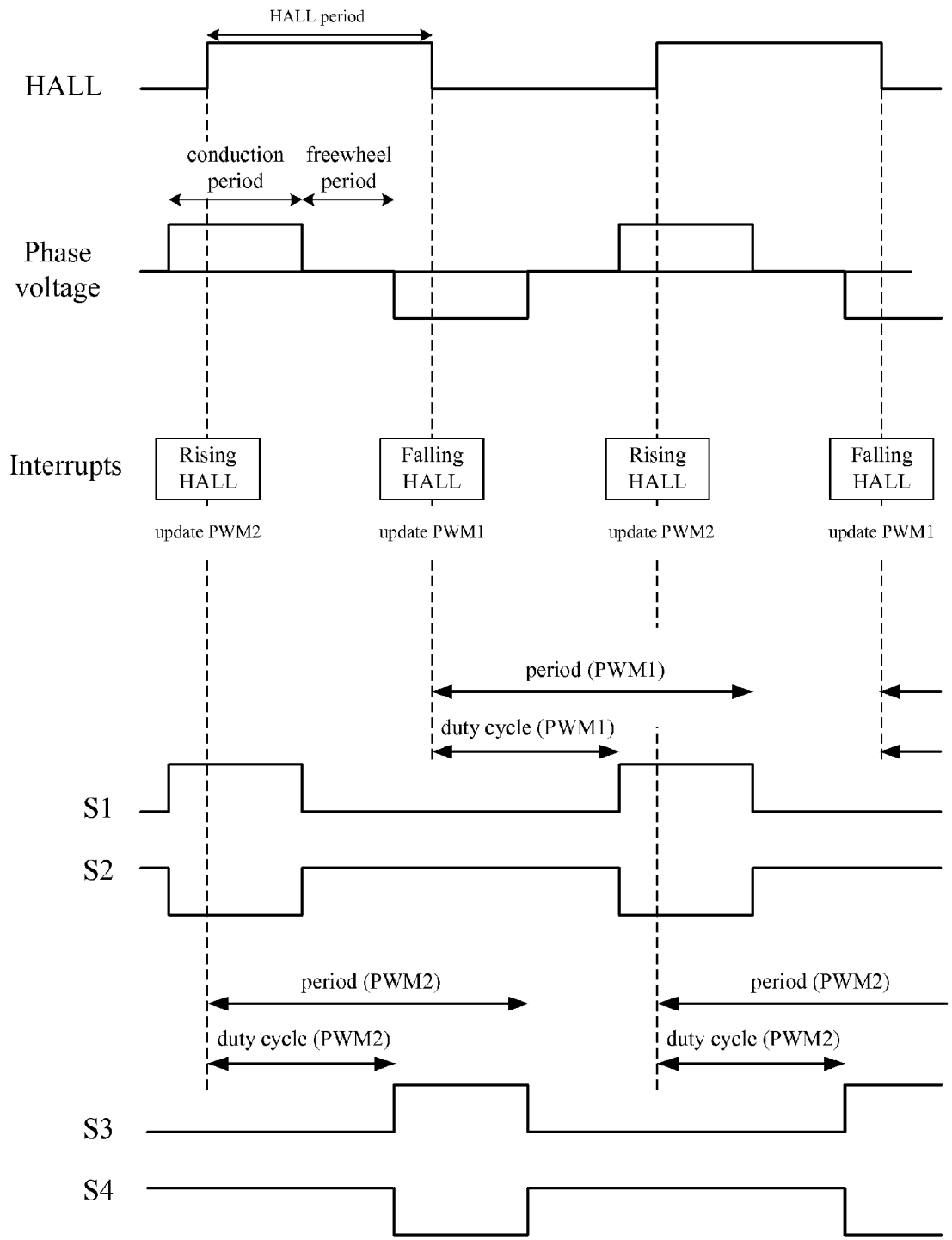
FIG. 9 illustrates various waveforms and interrupts of the motor assembly, including the control signals generated by the two PWM modules.

FIG. 9 illustrates the waveforms of the HALL signal, the phase voltage, the HALL interrupts, and the control signals S1-S4 generated by the two PWM modules 20,21.

Each PWM module 20,21 ideally generates a single cycle only in response to a rising or falling HALL edge. If a PWM module were to generate an additional pulse, the control signals S1-S4 would be toggled inadvertently. This would then cause the phase winding 7 to be freewheeled at a time when the phase winding 7 should be excited, or vice versa. This situation can be avoided through appropriate values for the phase period and/or the conduction period. For example, if changes in the length of the HALL period are ignored, the situation can be avoided by ensuring that T_CD≥2*T_PHASE. However, placing constraints on the values of the phase period and the conduction period may be undesirable. For example, it may be necessary to employ a relatively large phase period in order to achieve the desired power. Alternatively, the efficiency of the motor 3 may be improved by having a conduction period and a phase period that do not satisfy this equation. The controller 14 therefore employs a scheme that prevents further pulses from being generated.

Figure 10:
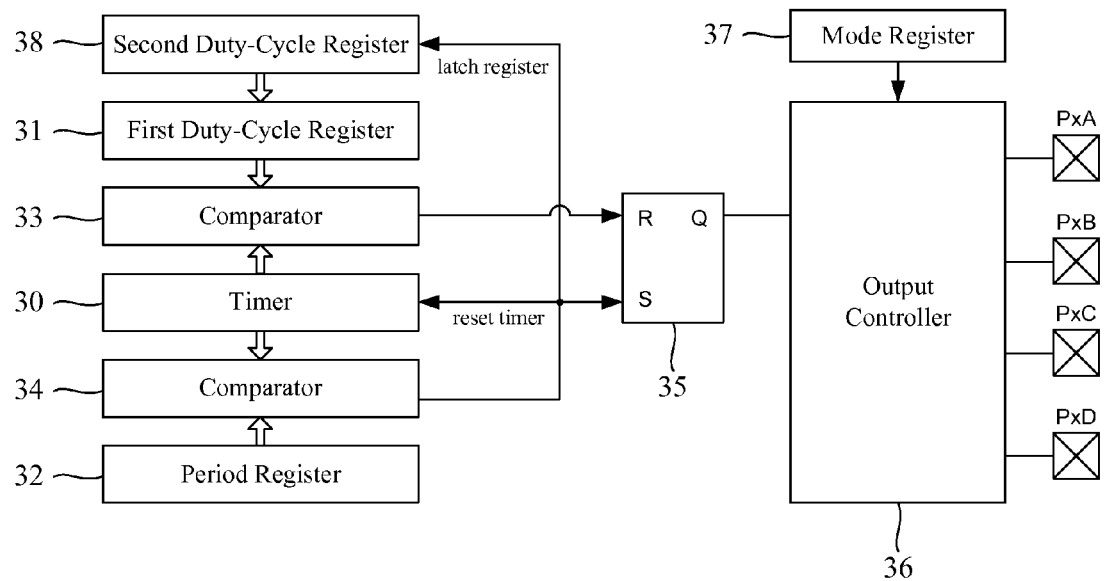
FIG. 10 is similar to FIG. 8 but highlights the provision of two duty-cycle registers within each PWM module.

As illustrated in FIG. 10, each PWM module 20,21 actually comprises two duty-cycle registers 31,38. The first comparator 33 of the PWM module 20,21 consistently compares the timer 30 against the first duty-cycle register 31. However, when the timer 30 and the period register 32 correspond, the second duty-cycle register 38 is latched (i.e. copied) to the first duty-cycle register 31. Accordingly, when the PWM module 20,21 is restarted, the first duty-cycle register 31 is used to define the duty cycle of the first cycle of the PWM signal. The second duty-cycle register 38 is then used to define the duty cycle of all subsequent cycles of the PWM signal. The processor 15 then makes use of this feature in order to prevent further pulses from being generated. When executing the HALL ISR, the processor 15 loads the first duty-cycle register 31 of the PWM module 20,21 with the commutation period (i.e. T_HALL−T_PHASE). The processor 15 additionally loads the second duty-cycle register 38 with the maximum possible value for that register (e.g. 0xFF for an 8-bit register). Accordingly, when the timer 30 and the first duty-cycle register 31 correspond, the PWM module 20,21 toggles the control signals causing the phase winding 7 to commutate. When the timer 30 and the period register 32 subsequently correspond, the PWM module 20,21 again toggles the control signals causing the phase winding 7 to freewheel. Additionally, the timer 30 is reset and the second duty-cycle register 38 is latched to the first duty-cycle register 31. The timer 30 then continues to increment. However, since the first duty-cycle now stores the maximum possible value, the next HALL edge occurs before the timer 30 and the first duty-cycle register 31 correspond. As a result, the PWM module 20,21 is updated and restarted before the next pulse can be generated.

In the embodiment described above, the duty cycle of each PWM module 20,21 defines the point in time at which the phase winding 7 is commutated, and the period defines the point in time at which the phase winding 7 is freewheeled. In an alternative embodiment, the duty cycle may be used to define the point in time at which the phase winding 7 is freewheeled, and the period may be used to define the point in time at which the phase winding 7 is commutated. For example, when updating the PWM registers as part of the HALL ISR, the processor 15 may load the duty-cycle and period registers 31,32 with the following values:

duty cycle=$T\_CD-T\_PHASE$ period=$T\_HALL-T\_PHASE$

When the timer 30 and the duty-cycle register 31 correspond, the output pin for S1 (PWM1) or S3 (PWM2) is pulled logically low and the output pin for S2 (PWM1) or S4 (PWM2) is pulled logically high. This then causes the phase winding 7 to freewheel. When the timer 30 and the period register 32 correspond, the output pin for S1 (PWM1) or S3 (PWM2) is pulled logically high and the output pin for S2 (PWM1) or S4 (PWM2) is pulled logically low. This then causes the phase winding 7 to commutate. Accordingly, in a more general sense, one of the duty cycle and the period of each PWM module 20,21 may be said to define the point in time at which the phase winding 7 is commutated, and the other of the duty cycle and the period may be said to define the point in time at which the phase winding 7 is freewheeled. A potential disadvantage with this alternative embodiment is that the conduction period, T_CD, must be longer than phase period, T_PHASE. This constraint on the lengths of the conduction period and the phase period may be undesirable.

Figure 11:
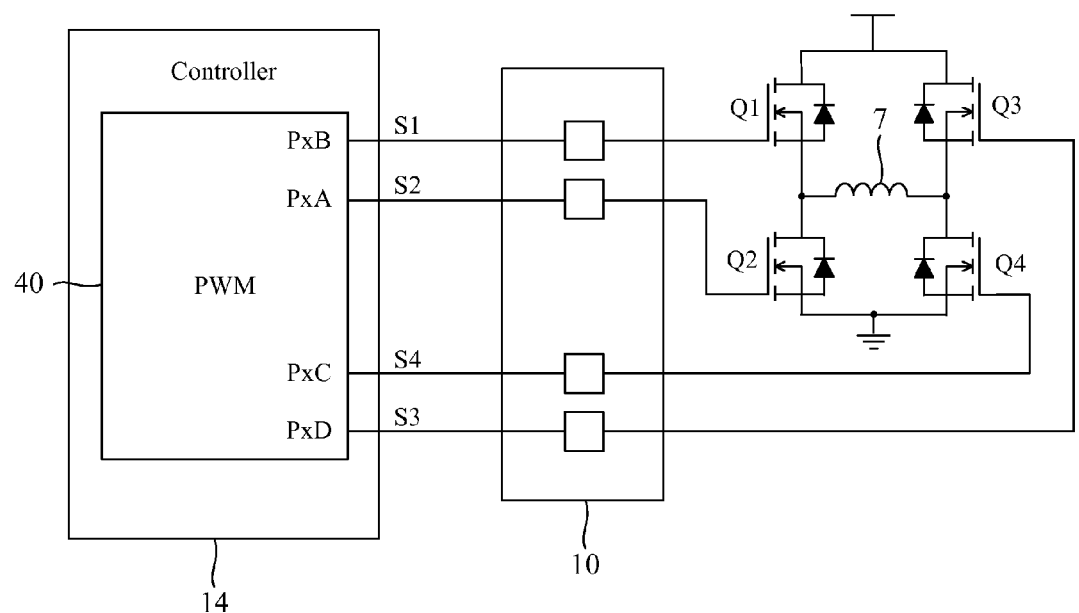
FIG. 11 illustrates the controller in a second, alternative configuration in which a single PWM module is configured in full-bridge mode.

In the embodiment described above, the controller 14 employs two PWM modules 20,21, each of which is configured to operate in half-bridge mode. FIG. 11 illustrates an alternative embodiment in which the controller 14 employs a single PWM module 40 that is configured to operate in full-bridge mode. As noted above, full-bridge mode is achieved by loading the mode register 37 of the PWM module 40 with the values 0x10 (forward) or 0x11 (reverse). When configured to operate in full-bridge mode, the output controller 36 controls four output pins (PxA, PxB, PxC, PxD), which are then used for the four control signals S1-S4. The duty-cycle register 31 and the period register 32 are again used to define the points in time at which the phase winding 7 is commutated and freewheeled. The PWM module 40 is configurable (i.e. by means of the mode register 37) to operate in forward mode or reverse mode. When configured in forward mode, the output pins for S2 and S3 are inactive and are pulled logically low. Additionally, the output pin for S4 is continuously active and is pulled logically high. Consequently, only the output pin for Si is modulated by the PWM module. Conversely, when configured in reverse mode, the output pins for Si and S4 are inactive and are pulled logically low, the output pin for S2 is continuously active and is pulled logically high, and only the output pin for S3 is modulated by the PWM module 40.

Operation of the controller 14 during steady-state mode proceeds as follows. In response to a timer overflow interrupt, the processor 15 updates the duty-cycle and period registers 31,32 of the PWM module 40 with the following values:

duty cycle=$T\_CD$ period=$2*T\_HALL-T\_PHASE-TMRX$

The processor 15 selects the conduction period and the phase period from the voltage and speed lookup tables, and calculates the period 2*T_HALL-T_PHASE during execution of the main code. TMRX is the current value of a timer that is responsible for recording the length of each HALL period. This timer is distinct from the timer of the PWM module 40 and is used solely for the purposes of measuring the HALL period. In order to distinguish this timer from that of the PWM module 40, the timer will hereafter be referred to as timer X. When the processor 15 services the timer overflow interrupt, timer X stores the length of time that has elapsed since the last HALL edge. After updating the registers 31,32 of the PWM module 40, the processor 15 toggles the mode register 37 of the PWM module 40. Consequently, if the PWM module 40 was operating in forward mode, the PWM module 40 now operates in reverse mode.

After updating and restarting the PWM module 40, the timer 30 increments. When the timer 30 and the duty-cycle register 31 correspond, S1 (forward mode) or S3 (reverse mode) is pulled logically low causing the phase winding 7 to freewheel. The timer 30 then continues to increment. When the timer 30 and the period register 32 correspond, the timer overflow interrupt is generated. In response to the timer overflow interrupt, the processor 15 updates the registers 31,32 of the PWM module 40 and toggles the mode register 37. As a consequence of toggling the mode register 37, S1 and S4 (forward mode) or S2 and S3 (reverse mode) are pulled logically high thus causing the phase winding 7 to commutate.

The PWM module 40 is therefore updated and restarted in response to a timer overflow interrupt rather than a HALL interrupt. Nevertheless, a HALL interrupt continues to be generated. When servicing the HALL interrupt, the processor 15 captures the HALL period stored by timer X and then restarts timer X. Accordingly, in contrast to the half-bridge mode, there is a possibility of interrupt clashing. In particular, the timer overflow interrupt may clash with the HALL interrupt when attempting to commutate the phase winding 7 at or near the HALL edges. Since the HALL period is used to determine the points in time at which the phase winding 7 is commutated and freewheeled, any delay in servicing the HALL interrupt may adversely affect the performance of the motor 3. Additionally, if the HALL interrupt is serviced before the timer overflow interrupt, timer X will be reset and thus the value used for the period register 32 will be incorrect. This clashing of interrupts may be resolved in the following manner.

The peripherals 17 of the controller 14 comprise a capture module (not shown) which is configured to capture the value of timer X in response to each HALL edge. Accordingly, in response to each HALL edge, TMRX is captured to memory 16 and a HALL interrupt is generated. The value captured to memory 16 then represents the length of the previous HALL period. When servicing the HALL interrupt, the processor 15 determines the difference between the current value of timer X and the captured value. This difference represents the delay that has occurred between the HALL edge and the servicing of the HALL interrupt. The processor 15 then loads timer X with the difference. The net result is that, irrespective of when the HALL interrupt is serviced, timer X is reset at a time concurrent with the HALL edge. As a result, an accurate measure of the HALL period is obtained in spite of any delay that may occur in servicing the HALL interrupt.

When servicing the timer overflow interrupt generated by the PWM module 40, the processor 15 first determines whether the interrupt has occurred before or after the HALL edge. This is achieved by interrogating both the mode register 37 of the PWM module 40 and the level of the HALL signal. The processor 15 then updates the duty-cycle and period registers 31,32 of the PWM module 40. Irrespective of whether the timer overflow interrupt occurs before or after a HALL edge, the processor 15 updates the duty-cycle register 31 with the conduction period, i.e.

duty cycle=$T\_CD$

If the interrupt occurs before the HALL edge, the processor 15 updates the period register 32 with the following:

period=$2*T\_HALL-T\_PHASE-TMRX$

However, if the interrupt occurs after the HALL edge, the processor 15 instead updates the period register 32 with the following:

$$\text{period} = 2 \cdot T\_HALL - T\_PHASE - T\text{MRX} + T\_CAPTURE$$

where TMRX is the current value of timer X, and T_CAPTURE is the captured value of timer X. Since the timer overflow interrupt occurs after a HALL edge, timer X will have been reset by the HALL ISR. By including the captured value and the current value of timer X in the equation, the correct length for the period is obtained.

Even if the above scheme for avoiding interrupt clashing is not employed, the use of a single PWM module 40 configured in full-bridge mode nevertheless has benefits. For example, the start of freewheel can occur at any time. In contrast, if a timer interrupt were used to start freewheeling, the timer interrupt may clash with the HALL interrupt. Moreover, it may not be necessary to commutate the phase winding 7 in synchrony with the HALL edges. For example, the controller 14 may operate in low-power mode or high-power mode when operating at steady state. The controller 14 may then advance commutation when operating in high-power mode and retard commutation when operating in low-power mode. As a result, interrupt clashing of the timer overflow interrupt and the HALL interrupt may be avoided.

Two embodiments have been described in which the controller 14 comprises a pair of PWM modules 20,21 configured in half-bridge mode, and a single PWM module 40 configured in full-bridge mode. Each of the two embodiments has its advantages and disadvantages. For example, a single PWM module 40 configured in full-bridge mode has the advantage that only one PWM module 40 and thus one timer 30 are required. As a result, a cheaper controller 14 may be used. However, a disadvantage of this embodiment is that only one of the low-side switches Q2,Q4 is closed during freewheeling. As a result, the phase current is required to flow through the diode of the open low-side switch during freewheeling. Power losses are therefore likely to be greater and thus the efficiency of the motor 3 may be reduced. On the other hand, closing only one of the low-side switches Q2,Q4 may actually have an advantage. For example, if both low-side switches Q2,Q4 are closed during freewheeling then it is possible for the phase current to decay to zero and then flow in the opposite direction during the freewheel period. This may occur if, for example, the magnitude of the back EMF is relatively high and/or the freewheel period is relatively long. Phase current flowing in the opposite direction would then generate negative torque, which is generally undesirable. By closing only one of the low-side switches Q2 or Q4 during freewheeling, the diode of the other low-side switch then prevents the phase current from flowing in a direction that generates negative torque. Two PWM modules 20,21 configured in half-bridge mode have the advantage that the modules 20,21 are able to operate without ever generating a software interrupt. Additionally, two PWM modules have the advantage that both low-side switches Q2 and Q4 may be closed during freewheeling. As a result, the efficiency of the motor 3 may be improved.

However, as already noted, this may prove to be a disadvantage if the phase current is able to decay beyond zero during the freewheel period.

Irrespective of whether a pair of PWM modules 20,21 or a single PWM module 40 is employed, the control signals S1-S4 responsible for commutating and freewheeling the phase winding 7 are generated by hardware rather than software. As a result, interrupt clashing may be avoided or reduced.

In the case of two PWM modules 20,21 configured in half-bridge mode, the control signals S1-S4 for both commutation and freewheeling are generated without any interruption to the software. One of the PWM modules 20 modulates the control signals S1,S2 during one half of each electrical cycle of the motor 3. The other PWM module 21 then modulates the control signals S3,S4 during the other half of each electrical cycle. Since only one of the PWM modules 20,21 modulates the control signals at any one time, the processor 15 is able to update the other of the PWM modules 20,21 at any time during the electrical half-cycle. Consequently, it is not necessary for the PWM modules 20,21 to generate an interrupt in order for the processor 15 to update the modules 20,21. Instead, the processor 15 can update the PWM modules 20,21 when servicing the HALL interrupt.

In the case of a single PWM module 40 configured in full-bridge mode, the control signals S1-S4 for commutating and freewheeling the phase winding 7 are likewise generated without the need for interrupting the software. Since there is only one PWM module 40, the PWM module 40 is responsible for modulating the control signals S1-S4 during both halves of each electrical cycle of the motor 3. As a result, it is important to update the PWM module 40 only at the very end of each PWM cycle. It is therefore necessary for the PWM module 40 to generate an interrupt in order that the processor 15 might know when to update the PWM module 40. Although an interrupt is required in order to update the PWM module 40, a scheme has been described for handling the potential clash of this interrupt with the HALL interrupt. As a result, the performance of the motor 3 is unaffected.

In both embodiments, the controller 14 is able to control the excitation of the phase winding 7 without any constraints on the times at which the phase winding 7 is commutated or freewheeled. In particular, the controller 14 is free to commutate and/or freewheel the phase winding 7 at times at or near the HALL edges. As a result, the performance (e.g. power and/or efficiency) of the motor 3 may be improved.

The use of a PWM module configured in half-bridge or full-bridge mode is known. However, the PWM module is typically used to generate a PWM signal that repeats for many cycles during each electrical half-cycle of the motor (i.e. between commutation points). Additionally, the PWM signal typically repeats for many cycles during which the duty cycle and the period are unchanged. With the controller 14 of the present invention, on the other hand, each cycle of the PWM signal corresponds to an electrical half-cycle of the motor 3. One of the duty cycle and the period of the PWM module 20,21,40 then defines the time at which the phase winding 7 is commutated, and the other of the duty cycle and the period defines the time at which the phase winding 7 is freewheeled. The two pulses within each cycle of the PWM signal therefore define the lengths of the conduction period and the freewheel period. Consequently, the duty cycle and the period may be said to define the times at which the conduction period and the freewheel period start. Furthermore, with the controller 14 of the present invention, the duty cycle and the period of each PWM module 20,21,40 are updated after each cycle of the PWM signal.

When a particular control signal S1-S4 changes, there is a short delay between the changing of the control signal and the physical opening or closing of the corresponding power switch Q1-Q4. If a further control signal were changed during this delay period, it is possible that both switches on a particular leg of the inverter 9 (i.e. Q1,Q3 or Q2,Q4) may be closed at the same time. This short-circuit, or shoot-through as it is often termed, would then damage the switches on that particular leg of the inverter 9. Accordingly, in order to prevent shoot-through, each PWM module 20,21, 40 may be configured with a dead band delay. Again, the use of a PWM module configured in half-bridge or full-bridge mode with a dead band delay is known and will not therefore be described here further.

In the embodiment described above, the motor assembly 1 comprises a brushless permanent-magnet motor 3 having a single-phase winding 7. The controller 14 then comprises one or more PWM modules that are configured to generate control signals for controlling the excitation of the phase winding 7. However, the controller 14 may be configured to control the excitation of a permanent-magnet motor having more than one phase winding. For example, for a three-phase permanent-magnet motor, the controller 14 could comprise three PWM modules, each PWM module being configured in half-bridge mode for controlling two of the six switches of the inverter. Additionally, the controller 14 may be configured to control the excitation of other types of motor, including reluctance motors. By way of example only, the controller 14 may comprise a single PWM module configured in full-bridge for controlling the switches of a two-phase switched reluctance motor. Accordingly, in a more general sense, the controller 14 may be said to comprise one or more PWM modules configured in half-bridge or full-bridge mode so as to generate control signals for controlling the excitation of phase windings of a brushless motor. For a permanent-magnet motor, the phase windings are typically commutated at times relative to zero-crossings in the back EMF. The phase period, T_PHASE, then corresponds to the interval between commutation and a zero-crossing in the back EMF. For a reluctance motor, on the other hand, the phase windings are typically commutated at times relative to minima in the inductance of the phase windings. The phase period then corresponds to the interval between commutation and a minimum in the inductance.

The invention claimed is:

1. A controller for a brushless motor, the controller comprising a PWM module configured in half-bridge or full-bridge mode, wherein the PWM module outputs control signals for controlling the excitation of a winding of the motor, and one of the duty cycle and the period of the PWM module defines a time at which the winding is commutated.

2. The controller of claim 1, wherein the other of the duty cycle and the period defines a time at which the winding is freewheeled.

3. The controller of claim 1, wherein the duty cycle or the period of the PWM module is updated after each cycle of the PWM module.

4. The controller of claim 1, wherein the controller divides an electrical half-cycle of the motor into a conduction period followed by a freewheel period, the PWM module outputs control signals for exciting the winding during the conduction period and for freewheeling the winding during the freewheel period, the duty cycle of the PWM module defines one of a time at which the conduction period or the freewheel period starts, and the period defines the other of a time at which the conduction period or the freewheel period starts.

5. The controller of claim 1, wherein the PWM module outputs control signals for commutating the winding relative to zero-crossings in back EMF or rising inductance in the winding at times defined by a phase period, and the duty cycle or the period of the PWM module is defined by the phase period.

6. The controller of claim 1, wherein the controller comprises a first PWM module configured in half-bridge mode, and a second PWM module configured in half-bridge mode, the first PWM module modulates the control signals during one half of an electrical cycle of the motor, and the second PWM module modulates the control signals during the other half of the electrical cycle.

7. The controller of claim 6, wherein the duty cycle or period of the first PWM module is updated during the cycle of the second PWM module, and the duty cycle or period of the second PWM module is updated during the cycle of the first PWM module.

8. The controller of claim 6, wherein the controller receives a rotor-position signal having edges, the controller comprises a processor, and the processor updates the duty cycle or the period of the first PWM module in response to a rising edge in the rotor-position signal, and the processor updates the duty cycle or the period of the second PWM module in response to a falling edge in the rotor-position signal.

9. The controller of claim 1, wherein the controller comprises a PWM module configured in full-bridge mode and a processor, the PWM module generates an interrupt at the end of each cycle, and the processor updates the duty cycle or the period of the PWM module in response to the interrupt.

10. A controller for a brushless motor, the controller comprising a PWM module configured in half-bridge or full-bridge mode, wherein the controller divides each electrical half-cycle of the motor into a conduction period followed by a freewheel period, the PWM module outputs control signals for exciting a winding of the motor during the conduction period and for freewheeling the winding during the freewheel period, the duty cycle of the PWM module defines one of a time at which the conduction period or the freewheel period starts, and the period of the PWM module defines the other of a time at which the conduction period or the freewheel period starts.

11. The controller of claim 10, wherein the duty cycle or the period of the PWM module is updated after each cycle of the PWM module.

12. The controller of claim 1, wherein the controller is included in a control circuit for controlling a brushless motor, the control circuit comprises an inverter, the inverter comprises a full bridge of switches coupled to a winding of the motor, the controller comprises a single PWM module configured in full-bridge mode or two PWM modules configured in half-bridge mode, and the PWM module or modules output control signals for controlling the switches of the inverter.

13. The controller of claim 10, wherein the controller is included in a control circuit for controlling a brushless motor, the control circuit comprises an inverter, the inverter comprises a full bridge of switches coupled to a winding of the motor, the controller comprises a single PWM module configured in full-bridge mode or two PWM modules configured in half-bridge mode, and the PWM module or modules output control signals for controlling the switches of the inverter.

14. The controller of claim 12, wherein the control circuit is included in a motor assembly for a permanent-magnet motor having a single phase winding.

15. The controller of claim 13, wherein the control circuit is included in a motor assembly for a permanent-magnet motor having a single phase winding.

\* \* \* \* \*